United States Patent Office 2,851,345
Patented Sept. 9, 1958

2,851,345

FUEL OIL COMPOSITIONS

Byron E. Marsh, Berwyn, and Paul L. Du Brow, Richard L. Betcher, Frederick W. Smith, and Arthur Cizek, Chicago, Ill., assignors to Armour and Company, Chicago, Ill., a corporation of Illinois No Drawing. Application February 2, 1955
Serial No. 485,803

19 Claims. (Cl. 44—71)

This invention relates to improved fuel oil compositions.

It is well known that hydrocarbon fuel oils, such as those used in burner systems, diesel and combustion engines and other industrial and domestic equipment, are per se subject to numerous shortcomings due to chemical deterioration and impurities, either introduced or not removed in processing. For example, the oils tend in the presence of $H_2O$ to become corrosive to metallic surfaces after short periods of storage or exposure to the atmosphere. Many oils tend to develop undesirable solids or sludge which deleteriously affects the usefulness of the oils, either by diminution of their combustive capacity or by their tendency to clog the filters present in the equipment being employed. The petroleum industry has attacked the problem of improving fuel oil compositions from several angles. One is improved processing techniques; another is blending of oils; still a third, which is somewhat akin to the second, is the addition of chemical agents.

The quest of the petroleum industry for additives for fuel oils to improve their properties has been and continues to be a tedious and not too rewarding proposition. Part of the reason for this is the multitude of functions which an additive must perform. Besides being compatible with the oil, an additive should, in order of desirability and importance, (1) improve the filterability of the oil; (2) inhibit the formation of sludge; (3) stabilize the color of the oil; (4) inhibit corrosion; and (5) prevent emulsification of any water which may be present in the oil. Needless to say, the job of finding an additive agent which will perform all of the aforementioned functions is like looking for a needle in a haystack. There seems to be no way of predicting that a given chemical will or should perform as desired. That is, it cannot be predicted that a chemical known to be a good corrosion inhibiter will also inhibit the formation of sludge, or vice versa. One solution might be to employ a mixture of additive agents, each for their own particular function. However, this is no simple matter when the problem of chemical and physical compatibility and the multiplicity of functions is considered. To our knowledge, no one has ever provided a single chemical, or mixture of chemicals, as an additive for fuel oil which satisfactorily performs all of the functions hereinbefore outlined.

In accordance with the present invention, we have quite unexpectedly and gratifyingly discovered a whole family of compounds, the members of which perform the above-mentioned functions in a combined degree heretofore unobtainable by previously known fuel oil additives.

It is, therefore, an object of this invention to provide improved fuel oil compositions.

The basic structure of the chemical compounds which we employ in our improved fuel oil additives can be represented by the general formula R—NH—A—COOH wherein A is a divalent aliphatic hydrocarbon radical having from 2 to 3 carbon atoms, and R is a radical of the group consisting of (A) aliphatic hydrocarbon radicals having from 8 to 22 carbon atoms; and (B) hydrocarbon radicals as derived from rosin and tall oil acids. Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, mixtures of the foregoing radicals as derived from tallow, soybean oil, coconut oil, and other animal and vegetable oils, and hydrocarbon radicals as derived from the acids of rosin and tall oil, such as abietic acid, dehydroabietic acid, dihydroabietic acid, and tetrahydroabietic acid.

The above basic compounds can be prepared by reacting a primary amine and an unsaturated acid such as acrylic acid, methacrylic acid, and crotonic acid. The reaction between a primary amine and crotonic acid can be illustrated by the following equation:

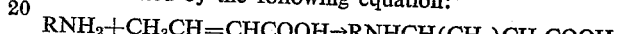

$RNH_2 + CH_3CH=CHCOOH \rightarrow RNHCH(CH_3)CH_2COOH$

It will be seen from the foregoing equation that the reaction is essentially an addition reaction, the amine group adding across the double bond of the acid. When preparing the basic compounds according to the equation, the preferred primary amine is primary tallow amine. The preferred unsaturated acid is crotonic acid. However, other lower unsaturated acids, or their lower alkyl esters, can be employed.

We have also discovered that the alkali metal and alkaline earth metal salts of the basic compounds as hereinbefore described are extremely effective when added to fuel oils. In this category are included the potassium, lithium, sodium, calcium and magnesium salts of the basic compounds. The preferred salts are the sodium and calcium derivatives.

Other salts of the basic compounds which can be effectively added to fuel oils in accordance with our invention include the monoamine and diamine salts whereein the monoamine is either primary, secondary or tertiary and of the formulae $RNH_2$, $R_2NH$ and $R_3N$, and the diamine $R'NH(CH_2)_nNH_2$ wherein R can be any aliphatic hydrocarbon radical having from 1 to 22 carbon atoms or a hydrocarbon radical as derived from rosin or tall oil acids, R' can be any aliphatic hydrocarbon radical having from 8 to 22 carbon atoms or a hydrocarbon radical as derived from rosin or tall oil acids, and $n$ is an integer of from 2 to 5. Examples of the higher aliphatic hydrocarbon and rosinyl radicals within the foregoing definition are the same as hereinbefore mentioned. Examples of lower hydrocarbon radicals include methyl, ethyl, propyl, isopropyl, butyl, isobutyl, pentyl, etc. The preferred monoamine salts are salts of the basic compounds and secondary amines. The preferred diamine salts are salts of the basic compounds and N-aliphatic trimethylene diamines sold by Armour and Company under the trade name Duomeen. The amine salts, generally, can be made by mixing equimolar quantities of the basic compound and the desired amine and heating slightly.

Other members of the family of compounds which can be effectively added to fuel oils in accordance with our invention include the lower alkyl esters of the basic compounds, such as the methyl ester, the ethyl ester, the propyl ester, the isopropyl ester, the butyl ester, and the isobutyl ester. These compounds can be prepared by reacting the appropriate ester of an unsaturated acid, such as crotonic acid, with a primary amine as described in connection with the preparation of the basic compound.

The quantity of the chemical which can be added to the fuel oil in accordance with the present invention can vary within wide limits, depending upon the nature of the oil and the use to which it is to be put. While the concentration of the added chemical may be as low as about 25 parts per million and as high as 1% or 2%, we prefer, in the case of a domestic fuel oil, to add between about 50 and about 100 parts per million of chemical additive. Our chemical additives are in general oil soluble, and to a degree sufficient to provide the desired concentration of additive in the resulting fuel oil.

The following examples will help to illustrate the underlying principles of our invention and are not intended to be unduly limiting thereof.

*Example I*

Two samples of a domestic fuel oil comprised of 50% straight run distillates and 50% catalytically cracked distillates, one sample containing additionally 50 parts per million of a compound having the formula $$RNHCH(CH_3)CH_2COOH$$

wherein R is a mixture of hydrocarbon radicals derived from coconut oil fatty acids, were subjected to ultra-violet irradiation in an open vessel for about 7 hours using nitrogen for agitation. The average temperature of the oil during irradiation was about 115° F. The samples were then allowed to stand protected from light and at room temperature for approximately 17 hours. The filterability of the samples was determined by measuring the time required to filter 100 cc. through 10-micron filter paper, maintaining a constant head of liquid during the filtration. The filterability on the control sample was 574 seconds/100 cc.; the filterability on the test sample was 376 seconds/100 cc.

The amount of insoluble sludge in each of the control and the test samples was determined by filtering a measured amount of each sample through a sintered-glass crucible, rinsing the crucible free of fuel oil with filtered mineral spirits, drying the crucible to constant weight at 240° F., and determining the increase in weight of each of the crucibles. The control sample contained 64.5 mg. of sludge per liter of oil; the test sample contained 31.5 mg. of sludge per liter of oil.

The emulsification characteristics of the test sample was determined by putting 20 cc. of distilled water and 80 cc. of the oil containing the additive in a graduated cylinder, stoppering the same and inverting it about 15 times to form an emulsion, and measuring the time necessary for the emulsion to break to a 2 cc. interface. An oil is acceptable in this respect if the time required for such a break is less than 4½ minutes, and good if the time is between 1½ and 2½ minutes. The present test sample demonstrated good emulsification properties.

*Example II*

Two samples comprised of a 50–50 blend of straight run and catalytically cracked distillates, one sample containing additionally 50 parts per million of a compound having the formula $$RNHCH(CH_3)CH_2COOH$$

wherein R is a mixture of radicals as derived from tallow fatty acids, were tested in the manner described in Example I. The control sample had a filterability of 600 seconds/100 cc. and an insoluble sludge content of 64.5 mg. per liter. The test sample had a filterability of 230 seconds/100 cc. and had an insoluble sludge content of 22.0 mg. per liter. The test sample demonstrated good emulsification properties.

*Example III*

Two samples comprised of a 50–50 blend of straight run and catalytically cracked distillates, one sample containing additionally 50 parts per million of a compound having the formula $$RNHCH(CH_3)CH_2COOH$$

wherein R is a mixture of radicals as derived from tall oil acids, were put in vented containers and left in an oven at a temperature of 150 to 180° F. for a period of 72 hours. At the end of this period a visual observation was made for sludge and a determination of NPA color made. The control sample had an initial NPA color of 1+ and a final NPA color of 4½, and exhibited heavy sludge formation. The test sample had an initial NPA color of 1+ and a final color of 3−, and exhibited only slight sludge. The test sample demonstrated good emulsification characteristics.

*Example IV*

Two samples comprised of a 50–50 blend of straight run and catalytically cracked distillates, one sample containing additionally 50 parts per million of the sodium salt of a compound having the formula $$RNHCH(CH_3)CH_2COOH$$

wherein R is a mixture of radicals as derived from distilled tallow acids, were tested in the manner described in Example I. The control sample had a filterability of 600 seconds/100 cc. and contained 64.5 mg. of soluble sludge per liter of oil. The test sample had a filterability of 130 seconds/100 cc. and had an insoluble sludge content of 1.3 mg. per liter. The test sample exhibited excellent emulsification characteristics.

These samples were also tested in the manner described in Example III. The control sample had an initial NPA color of 1+ and a final NPA color of 3+, and exhibited heavy sludge formation. The test sample had an initial NPA color of 1+ and a final NPA color of 2−, and exhibited no visual sludge formation.

*Example V*

Two samples comprised of a 50–50 blend of straight run and catalytically cracked distillates, one sample containing additional 50 parts per million of the sodium salt of a compound having the formula $$RNHCH(CH_3)CH_2COOH$$

wherein R is a mixture of radicals as derived from tall oil acids, were treated in the manner described in Example III. The control sample had an initial NPA color of 1+ and a final NPA color of 3+, and exhibited heavy sludge formation. The test sample had an initial color of 1+, a final NPA color of 2− and exhibited no visual sludge formation. The test sample had excellent emulsification characteristics.

*Example VI*

Two samples comprised of a 50–50 blend of straight run and catalytically cracked distillates, one sample containing additionally 50 parts per million of the calcium salt of a compound having the formula $$RNHCH(CH_3)CH_2COOH$$

wherein R is a mixture of radicals as derived from distilled soybean oil fatty acids, were tested in the manner described in Example I. The control sample had a filterability of greater than 500 seconds/100 cc. and contained 59.0 mg. of insoluble sludge per liter of oil. The test sample had a filterability of 150 seconds/100 cc. and contained 22.0 mg. of insoluble sludge per liter of oil. The test sample also showed excellent emulsification characteristics.

These samples were further tested in the manner described in Example III. The control sample had an initial NPA color of 1+, a final NPA color of 4+ and exhibited heavy sludge formation. The test sample had an initial color of 1+, a final color of 2½ and exhibited no visual sludge formation.

*Example VII*

Two samples comprised of a 50–50 blend of straight run and catalytically cracked distillates, one sample containing additionally 50 parts per million of the salt of a primary amine derived from distilled soybean oil acids and a compound of the formula $$RNHCH(CH_3)CH_2COOH$$

wherein R is a mixture of radicals derived from distilled soybean oil acids, were tested in the manner described in Example III. The control sample had an initial NPA color of 1+, a final NPA color of 4+, and exhibited heavy sludge formation. The test sample had an initial NPA color of 1+ and a final NPA color of 3, and exhibited only a slight amount of visual sludge. The test sample showed excellent emulsification characteristics.

*Example VIII*

Two samples of a domestic fuel oil comprising approximately a 50–50 blend of straight run and analytically cracked distillates, one sample containing additionally 50 parts per million of the secondary dicoco amine salt of a compound having the formula $$RNHCH(CH_3)CH_2COOH$$

wherein R is a mixture of radicals as derived from distilled soybean oil fatty acids, were tested according to the procedure described in Example III. The control sample had an initial NPA color of 1+, a final NPA color of 4+ and exhibited heavy visual sludge formation. The test sample had an initial NPA color of 1+, a final NPA color of 2½+ and exhibited only very slight visual sludge formation. The test sample also exhibited excellent emulsification characteristics.

*Example IX*

Two samples of a domestic fuel oil comprised of approximately a 50–50 blend of straight run and catalytically cracked distillates, one sample containing additionally 100 parts per million of a compound represented by the formula $$RNHCHCH_2CH_2COOCH_3$$

wherein R is a mixture of radicals derived from coconut oil fatty acids, were tested in accordance with the procedure described in Example I. The control sample had a filterability of 293 seconds/100 cc. and contained 64.5 mg. of insoluble sludge per liter of oil. The test sample had a filterability of 109 seconds/100 cc. and contained 17.0 mg. of insoluble sludge per liter of oil. The test sample exhibited good emulsification characteristics.

*Example X*

Two samples comprised of a 50–50 blend of straight run and catalytically cracked distillates, one sample containing additionally 50 parts per million of the sodium salt of a compound having the formula $$RNHCH(CH_3)CH_2COOH$$

wherein R is a mixture of radicals derived from distilled tallow acids, were tested to determine their corrosiveness. 20 parts of tapped water and 180 parts of oil were mixed and poured over a No. 10–20 coupon of sand-blasted mild steel in an open container, and let stand open to the air for one week at room temperature. At the end of this period the steel coupons were checked for rust spots and pitting. The control sample, that is, the fuel oil containing no additive, exhibited severe rusting and pitting on the entire coupon surface. The test sample exhibited only slight rusting and no pitting on the coupon.

While this invention has been described and exemplified in terms of its preferred modification, those skilled in the art will appreciate that variations can be made without departing from the spirit and scope of the invention.

We claim:

1. An improved fuel oil composition containing as an additive a minor amount, in the range between about 25 parts per million and 2 weight percent, of a compound selected from the group consisting of: (I) a compound of the formula R—NH—A—COOH wherein A is a divalent hydrocarbon radical having 2 to 3 carbon atoms and R is a radical of the group consisting of: (A) aliphatic hydrocarbon radicals having from 8 to 22 carbon atoms; and (B) hydrocarbon radicals as contained in rosin and tall oil: (II) an alkali metal salt of I; (III) an alkaline earth metal salt of I; (IV) a monoamine salt of I wherein the monoamine is one of the formulae R'NH$_2$, R'$_2$NH, and R'$_3$N, wherein R' is of the group consisting of aliphatic hydrocarbon radicals having from 1 to 22 carbon atoms and hydrocarbon radicals as contained in rosin and tall oil acids; (V) a diamine salt of I wherein the diamine is of the formula R"NH(CH$_2$)$_n$NH$_2$, wherein R" is of the group consisting of aliphatic hydrocarbon radicals having from 8 to 22 carbon atoms and hydrocarbon radicals as contained in rosin and tall oil acids, and n is an integer of from 2 to 5; and (VI) a lower alkyl ester of I.

2. An improved fuel oil composition containing as an additive a minor amount, in the range between about 25 parts per million and 2 weight percent, of a compound of the formula R—NH—A—COOH wherein A is a divalent hydrocarbon radical having 2 to 3 carbon atoms and R is a radical of the group consisting of (A) aliphatic hydrocarbon radicals having 8 to 22 carbon atoms; and (B) hydrocarbon radicals as derived from rosin and tall oil acids.

3. An improved fuel oil composition containing as an additive a minor amount, in the range between about 25 parts per million and 2 weight percent, of a compound of the formula R—NH—A—COOH wherein A is a divalent hydrocarbon radical having 2 to 3 carbon atoms and R is an aliphatic hydrocarbon having from 8 to 22 carbon atoms.

4. An improved fuel oil composition containing as an additive a minor amount, in the range between about 25 parts per million and 2 weight percent, of a compound of the formula RNHCH(CH$_3$)CH$_2$COOH wherein R is a mixture of hydrocarbon radicals as contained in tallow.

5. An improved fuel oil composition containing as an additive a minor amount, in the range between about 25 parts per million and 2 weight percent, of an alkali metal salt of a compound represented by the formula $$R—NH—A—COOH$$

wherein A is a divalent hydrocarbon radical having from 2 to 3 carbon atoms, and R is a radical of the group consisting of (A) aliphatic hydrocarbon radicals having from 8 to 22 carbon atoms; and (B) hydrocarbon radicals as contained in rosin and tall oil acids.

6. An improved fuel oil composition containing as an additive a minor amount, in the range between about 25 parts per million and 2 weight percent, of alkali metal salt of a compound represented by the formula $$R—NH—A—COOH$$

wherein A is a divalent hydrocarbon radical having from 2 to 3 carbon atoms, and R is an aliphatic hydrocarbon radical having from 8 to 22 carbon atoms.

7. An improved fuel oil composition containing as an additive a minor amount, in the range between about 25 parts per million and 2 weight percent, of sodium salt of a compound having the formula $$RNHCH(CH_3)CH_2COOH$$

wherein R is a mixture of hydrocarbon radicals as contained in tallow acids.

8. An improved fuel oil composition containing as an additive a minor amount, in the range between about 25 parts per million and 2 weight percent, of an alkaline earth metal salt of a compound represented by the formula R—NH—A—COOH wherein A is a divalent hydrocarbon radical having from 2 to 3 carbon atoms, and R is a radical of the group consisting of (A) aliphatic hydrocarbon radicals having from 8 to 22 carbon atoms;

and (B) hydrocarbon radicals as contained in rosin and tall oil acids.

9. An improved fuel oil composition containing as an additive a minor amount, in the range between about 25 parts per million and 2 weight percent, of an alkaline earth metal salt of a compound represented by the formula R—NH—A—COOH wherein A is a divalent hydrocarbon radical having from 2 to 3 carbon atoms, and R is an aliphatic hydrocarbon radical having from 8 to 22 carbon atoms.

10. An improved fuel oil composition containing as an additive a minor amount, in the range between about 25 parts per million and 2 weight percent, of a calcium salt of a compound represented by the formula

RNHCH(CH$_3$)CH$_2$COOH wherein R is a mixture of hydrocarbon radicals as contained in tallow.

11. Improved fuel oil composition containing as an additive a minor amount, in the range between about 25 parts per million and 2 weight percent, of a salt of a compound having the formula R—NH—A—COOH, wherein A is a divalent hydrocarbon radical having from 2 to 3 carbon atoms and R is a radical of the group consisting of (A) aliphatic hydrocarbon radicals having from 8 to 22 carbon atoms; and (B) hydrocarbon radicals as contained in rosin and tall oil acids, and a monoamine of the formula R'NH$_2$, R'$_2$NH, and R'$_3$N, wherein R' is of the group consisting of aliphatic hydrocarbon radicals having from 1 to 22 carbon atoms and hydrocarbon radicals as contained in rosin and tall oil acids.

12. An improved fuel oil composition containing as an additive a minor amount, in the range between about 25 parts per million and 2 weight percent, of a salt of a compound represented by the formula

R—NH—A—COOH wherein A is a divalent hydrocarbon radical having from 2 to 3 carbon atoms and R is an aliphatic hydrocarbon radical having from 8 to 22 carbon atoms, and a secondary aliphatic amine of the formula R'$_2$NH, wherein R, is an aliphatic hydrocarbon radical having from 1 to 22 carbon atoms.

13. Improved fuel oil composition containing as an additive a minor amount, in the range between about 25 parts per million and 2 weight percent, of a salt of secondary dicoco amine and a compound represented by the formula RNHCH(CH$_3$)CH$_2$COOH, wherein R is a mixture of hydrocarbon radicals as contained in tallow.

14. An improved fuel oil composition containing as an additive a minor amount, in the range between about 25 parts per million and 2 weight percent, of a salt of a compound represented by the formula

R—NH—A—COOH wherein A is a divalent hydrocarbon radical having from 2 to 3 carbon atoms and R is a radical of the group consisting of (A) aliphatic hydrocarbon radicals having from 8 to 22 carbon atoms; and (B) hydrocarbon radicals as contained in rosin and tall oil acids, and a diamine of the formula R'NH(CH$_2$)$_n$NH$_2$, wherein R' is of the group consisting of aliphatic hydrocarbon radicals having from 8 to 22 carbon atoms and hydrocarbon radicals as contained in rosin and tall oil acids, and $n$ is an integer of from 2 to 5.

15. An improved fuel oil composition containing as an additive a minor amount, in the range between about 25 parts per million and 2 weight percent, of salt of a diamine of the formula RNH$_2$CH$_2$CH$_2$CH$_2$NH$_2$ and an acid having the formula RNHCH(CH$_2$)CH$_2$COOH, wherein in each instance R is a mixture of hydrocarbon radicals as contained in tallow.

16. An improved fuel oil composition containing as an additive a minor amount, in the range between about 25 parts per million and 2 weight percent, of a compound represented by the formula R—NH—A—COOR", wherein A is a divalent hydrocarbon radical having from 2 to 3 carbon atoms and R is a radical of the group consisting of (A) aliphatic hydrocarbon radicals having from 8 to 22 carbon atoms; and (B) hydrocarbon radicals as contained in rosin and tall oil acids, and R" is an alkyl radical containing from 1 to 4 carbon atoms.

17. An improved domestic fuel oil composition containing as an additive 50 to 100 parts per million of a compound represented by the formula

RNHCH(CH$_3$)CH$_2$COOH wherein R is a mixture of hydrocarbon radicals as contained in tallow.

18. An improved domestic fuel oil composition containing as an additive 50 to 100 parts per million of the sodium salt of a compound represented by the formula RNHCH(CH$_3$)CH$_2$COOH, wherein R is a mixture of hydrocarbon radicals as contained in tallow.

19. An improved domestic fuel oil composition containing as an additive 50 to 100 parts of a chemical represented by the formula [RNHCH(CH$_3$)CH$_2$COO]$_2$Ca, wherein R is a mixture of hydrocarbon radicals as contained in tallow.

References Cited in the file of this patent

UNITED STATES PATENTS

| | | |
|---|---|---|
| 2,312,082 | Dietrich | Feb. 23, 1943 |
| 2,320,392 | White | June 1, 1943 |
| 2,686,776 | Keim | Aug. 17, 1954 |